Nov. 3, 1959    R. E. MEYER    2,910,829
EXHAUST NOZZLE INTERFLAP SEAL
Filed Aug. 24, 1956    6 Sheets-Sheet 2

INVENTOR
ROBERT E. MEYER
BY *Vernon F. Hauschild*
ATTORNEY

Nov. 3, 1959 R. E. MEYER 2,910,829
EXHAUST NOZZLE INTERFLAP SEAL
Filed Aug. 24, 1956 6 Sheets-Sheet 5

INVENTOR
ROBERT E. MEYER
BY Vernon F. Hauschild
ATTORNEY

United States Patent Office 2,910,829
Patented Nov. 3, 1959

2,910,829

EXHAUST NOZZLE INTERFLAP SEAL

Robert E. Meyer, Glastonbury, Conn., assignor to United Aircraft Corporation, East Hartford, Conn., a corporation of Delaware Application August 24, 1956, Serial No. 606,121

18 Claims. (Cl. 60—35.6)

This invention relates to exhaust nozzles, and more particularly, to the sealing of the area between the adjacent flaps of the exhaust nozzle.

It is an object of this invention to provide sealing means between the adjacent flaps of an exhaust nozzle which sealing means will permit relative circumferential motion between the flaps.

It is a further object of this invention to provide sealing means, one part of which frictionally engages the undersurfaces of adjacent flaps and which is supported and held in friction engagement against the flap undersurfaces by three engaging units or points; one of which serves to circumferentially locate this sealing means portion and to circumferentially center same with respect to adjacent flaps.

It is still a further object of this invention to provide a sealing means second portion which is located external of the flaps and which runs the full flap length to perform a gas sealing function in the exhaust nozzle closed position and to further provide a small rearwardly directed passage through which leakage gas must pass to be discharged to the atmosphere thus performing a thrust recovery function.

Figure 1:
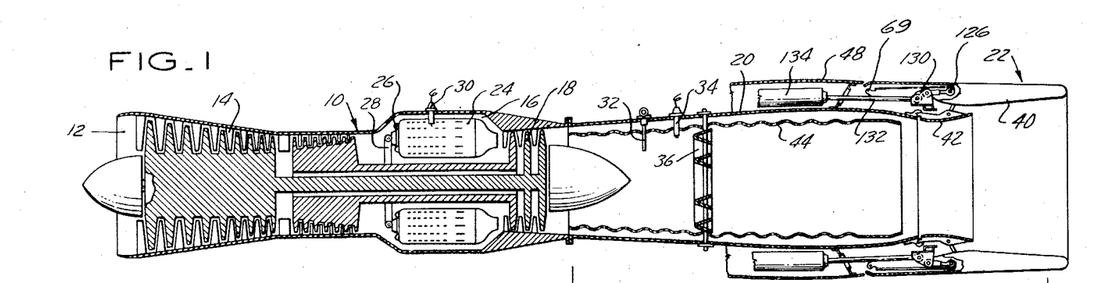
Fig. 1 is a cross-sectional view of a typical aircraft turbo-jet engine with afterburner and with the double flap, variable area exhaust nozzle of the type to which this application relates attached to the afterburner.
Figure 2:
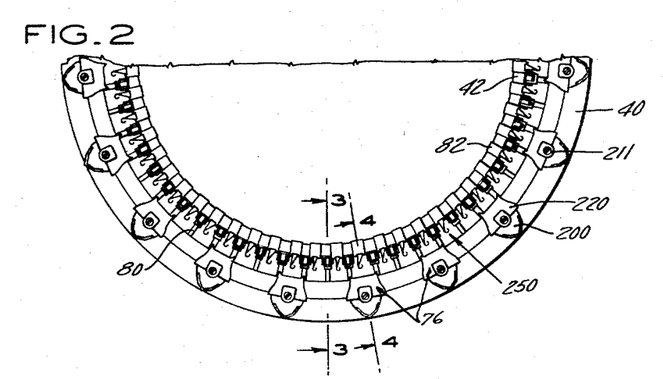
Fig. 2 is a partial rear view of the double flap exhaust nozzle attached to an afterburner.
Figure 3:
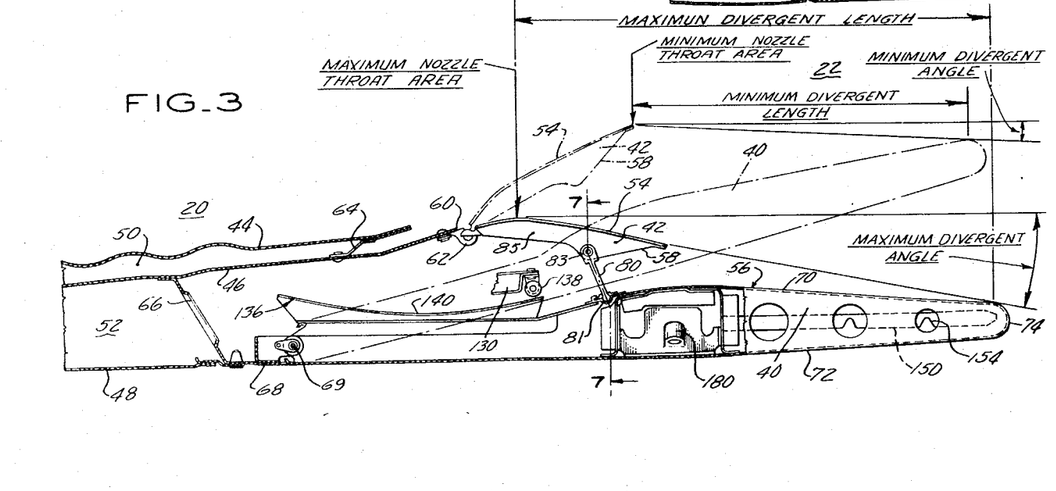
Fig. 3 is an enlarged view along line 3—3 of Fig. 2.

Referring to Fig. 1, we see aircraft turbo-jet engine 10 comprising air inlet section 12, compressor section 14, combustion section 16, turbine section 18, afterburner section 20 and exhaust nozzle 22. Air enters air inlet section 12 and is compressed as it passes through compressor section 14 then is heated by combustion chambers 24 as it passes through combustion section 16. Fuel enters combustion chamber 24 through fuel nozzles 26 which are provided fuel by fuel manifold 28. Spark plug 30 or other ignition means may be used to ignite the atomized fuel which enters combustion chamber 24. After leaving combustion section 16, the heated gases pass through turbine section 18 and thence through afterburner 20. In afterburner section 20, fuel is introduced through fuel spray bar 32 and is ignited by spark plug or other ignition means 34 while flameholders 36 are provided so that combustion may be supported downstream thereof. After passing through and being reheated in afterburner section 20, the exhaust gases then pass through exhaust nozzle 22 and are discharged into the atmosphere so as to produce thrust. Exhaust nozzle 22 consists basically of a plurality of outer flaps 40 and a plurality of inner flaps 42 which are surrounded by outer flaps 40. Exhaust nozzle 22 is shown in somewhat greater detail in Fig. 3 which shows afterburner cooling liner 44 located within and concentric with afterburner duct 46. Engine nacelle or other duct 48 is located outboard of and concentric with afterburner duct 46 and afterburner cooling liner 44 such that cooling air passage 50 is formed between afterburner cooling liner 44 and afterburner duct 46 while cooling air passage 52 is formed between afterburner duct 46 and engine nacelle or other duct 48. The cooling air which passes through cooling air passages 50 and 52 may be provided from any convenient source, such as ram air, engine compressor air, or any bleed air in a relatively cool section of the engine. The cooling air or other fluid which passes through cooling passage 50 is discharged and flows over the inner surface 54 of inner flaps 42 of exhaust nozzle 22. The cooling air or other fluid which passes through the cooling fluid passage 52 passes between outer flaps 40 and inner flaps 42 so as to cool the inner surface 56 of outer flaps 40 and the outer surface 58 of inner flaps 42. Still referring to Fig. 3, we see that afterburner duct 46 terminates in exhaust outlet 60, through which the gases from engine 10 are discharged after passing through afterburner 20. Afterburner duct 46 carries ring or attachment means 62, which permits inner flaps 42 to be pivotally attached to exhaust outlet 60. Referring to Figs. 2 and 3, it will be noted that the plurality of inner flaps 42 are located circumferentially about and pivotally attached to exhaust outlet 60. Separating means 64 may be used to concentrically locate afterburner cooling liner 44 with respect to afterburner duct 46. Separating means 64 may consist either of a convoluted strip or a series of finger springs located circumferentially about afterburner duct 46 or may consist of a ring with a plurality of windows spaced circumferentially about the ring. Again referring to Fig. 3, it will be seen that projection or conical support member 66 extends outwardly from afterburner duct 46 and carries support ring 68. The plurality of outer flaps 40 pivotally attach to projection 66 through ring 68. The plurality of outer flaps 40 are located circumferentially about projections 66 and, as best shown in Fig. 2, are separated such that spaces exist between adjacent outer flaps 40.

Figure 4:
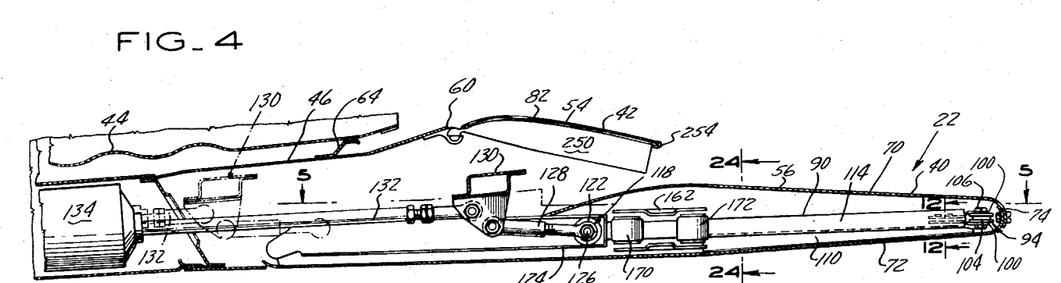
Fig. 4 is an enlarged view along line 4—4 of Fig. 2.
Figure 22:
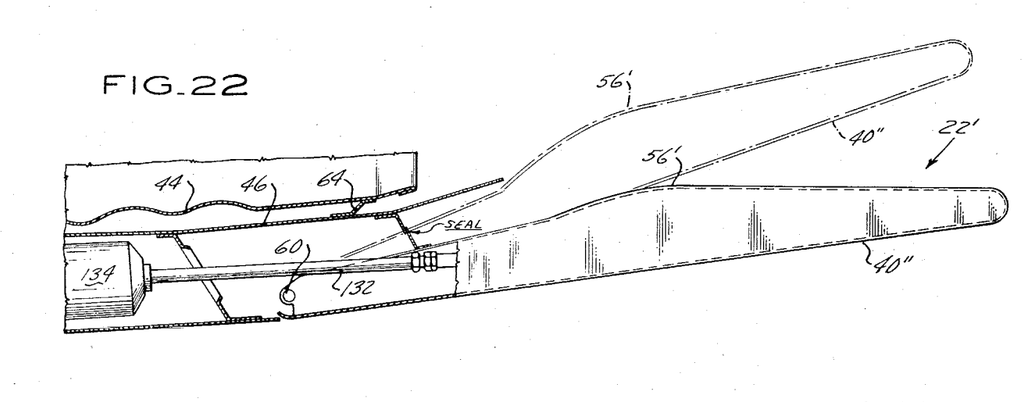
Fig. 22 is a partial cross-sectional view of a single flap exhaust nozzle utilizing the cam and opposed yoke actuating mechanism.

Now referring to Figs. 3 and 4, we see that outer flaps 40 consists of inner wall 70 and outer wall 72 spaced therefrom and a smooth fairing 74 smoothly connecting the after ends of inner wall 70 and outer wall 72. While not necessarily so limited, smooth fairing 74 may be of substantially semi-circular cross section. Inner wall 70 converges toward outer wall 72 at its after or downstream end such that outer flaps 40, when in their outer position, as shown in solid lines in Fig. 3, form a divergent exhaust nozzle at their after end, with outer flap interflap sealing means 76, to be described later, and shown in Fig. 2. It will be noted that connecting means or links 80 are pivotally attached to both outer flaps 40 at socket 81 and inner flaps 42 at hole 83 in web 85 thereby connecting outer flaps 40 with inner flaps 42 such that the actuation of either plurality of flaps will actuate the other plurality of flaps. Fig. 3 shows the plurality of inner flaps 42 and the plurality of outer flaps 40 in their extended position in solid lines and further shows both pluralities of flaps in their innermost position in phantom. It will be noted, as shown in Fig. 22, that outer flaps 40 may be used without inner flaps 42 by pivotally attaching the outer flaps 40" to exhaust outlet 60.

By referring to Figs. 2, 3 and 4 we see that the plurality of outer flaps 40 as connected circumferentially by outer flap interflap sealing means 76, which permits relative circumferential movement between outer flaps 40 and provides an exhaust nozzle with smooth inner and outer walls which are smoothly connected at their after ends so as to wholly or partially form the divergent section of the exhaust nozzle. It will further be seen that inner flaps 42 have smooth inner surface 54 which is shaped concave inwardly such that when in their extended position the plurality of inner flaps 42, when combined with inner flap interflap sealing strips 82, form a smooth convergent-divergent nozzle which blends with the divergent exhaust nozzle formed by outer flaps 40. When in their inner position as shown in phantom in Fig. 3, the plurality of inner flaps 42 form a convergent exhaust nozzle with outer flaps 40 so positioned with respect to inner flaps 42 that, in combination with fluid flow in annular passage 52, a divergent nozzle section is formed at all nozzle positions. Fluid flow in passage 52 which is exhausted through the annular orifice formed by the after end of inner flaps 42 and inner surface 56 of outer flaps 40 has the effect, in addition to the structure cooling effect previously mentioned, of aerodynamically filling in the step between the inner flaps 42 and outer flaps 40 thus forming a smooth divergent shape flow path for the exhaust gases. It will further be noted that the inner flaps interflap sealing means of strip 82 (see Figs. 4 and 7) smoothly joins and attaches to inner flaps 42 such that relative circumferential motion is permitted between inner flaps 42 and sealing strip 82.

In the double flap configuration shown in Figs. 2, 3 and 4, the outer flaps 40 only are caused to actuate and since they are connected by connecting means 80, the actuation of outer flaps 40 also actuates inner flaps 42. In the single flap configuration shown in Fig. 22, the same actuating means which is now to be described is used. This system consists of cam 90 (Fig. 5) which is located circumferentially between adjacent outer flaps 40 and contained within outer flap interflap sealing means 76 such that it is completely enclosed within outer flaps 40 and sealing means 76. Cam 90 may have lighting holes 92 therein and carries roller unit 94 at its downstream or after end. Roller unit 94 may consist of bracket 96 which is attached to the after or downstream end of cam 90 by any convenient attachment means such as rivets 98 and further consists of ear-like projections 100 and 101 which carry rollers 102 and 104 in rotatable fashion and rollers 102 and 104 rotate about any convenient axis such as nut and bolt unit 106. Roller unit 94 also has track 108 which engages inwardly directed lip 110 of outer flap interflap sealing means 76 so as to position said sealing means and center it with respect to adjacent outer flaps. It will be noted by referring to Fig. 5 that cam 90 has its greatest thickness at its after or downstream end and further has smooth side surfaces 112 and 114 against which the rollers of opposed yoke unit 116 bear and roll. Cam 90 is positioned so as to be substantially parallel to at least one of the plurality of flaps 40 or parallel to adjacent outer flaps 40. Roller unit 118 supports cam 90 at its forward or upstream end as the rollers 120 and 122 of roller unit 118 bear against or ride on tracks such as track 124. Any convenient axle such as nut and bolt unit 126 may be provided to permit the rolling of rollers 120 and 122. Variable length linkage 128 attaches the plurality of cams 90 which are positioned between adjacent outer flaps 40 to actuating ring 130, while variable length linkage 132 attaches actuating ring 130 to a plurality of actuating cylinder and piston units 134. Actuating cylinder and piston unit 134 consists of a piston within a cylinder, which piston is connected to linkage 132 and which is positioned within the cylinder by some fluid force which is governed by a variable area exhaust nozzle control such as is described in co-pending U.S. application Serial No. 503,133, so as to cause actuating ring 130 to be positionable and to move fore and aft between its after position, as shown in solid lines in Fig. 4 and its forward position as shown in phantom in Fig. 4. When actuating ring 130 is in its after or downstream position as shown in solid lines in Figs. 3 and 4 while when actuating ring 130 is in its farthest forward or upstream position as shown in phantom in Fig. 4, both inner flaps 42 and outer flaps 40 are in their inner position as shown in phantom in Fig. 3. When actuating cylinder and piston unit 134 are governed by a variable area exhaust nozzle control as described in the above-mentioned co-pending application, actuating ring 130 and therefore flaps 40 and 42 may be positioned in any intermediate position between their inner and outer positions.

Fig. 3 shows track unit 136 which is a support for actuating ring 130 to insure that it is centrally located with respect to afterburner duct 46 and outer flaps 40. A plurality of track units such as 136 are attached to the forward inner surfaces of outer flaps 40 and substantially equally spaced circumferentially about the exhaust nozzle formed by flaps 40. Track unit 136 may be placed on each flap 40 or may be placed in equally circumferential spaced relation but not on each flap 40. Track unit 136 projects inwardly and outwardly as it is carried by rotating flap 40 and is so contoured that roller unit 138, which is attached to actuating ring 130, bears against the contoured track surface 140 of track unit 136.

Cam 90 may be any desired cam proportion so that the flaps of the exhaust nozzle operate at optimum speeds and form optimum areas for the given power plant configuration instead of separating or operating uniformly. While not necessarily so limited, cam 90, as shown in Fig. 5, is in the shape of a simple wedge.

Figure 5:
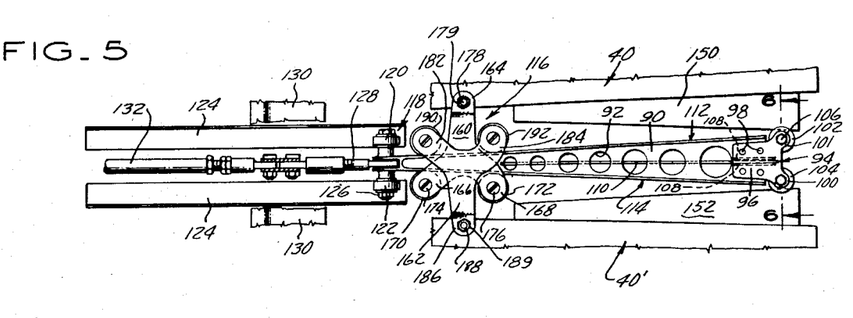
Fig. 5 is a view along line 5—5 of Fig. 4.
Figures 6, 7, 8, 9, 10, 11, 13:
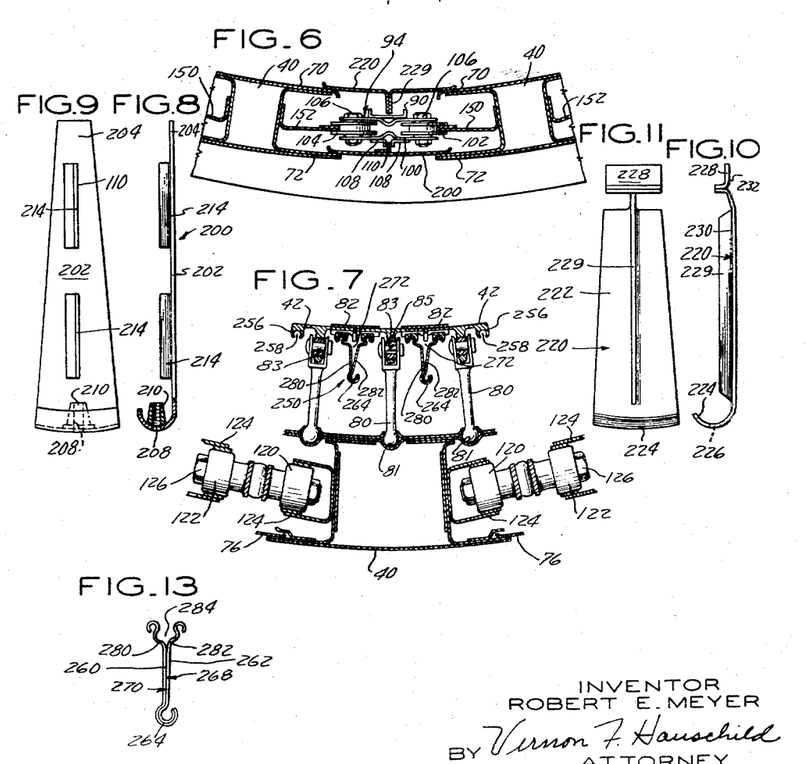
Fig. 6 is a view along line 6—6 of Fig. 5.
Fig. 7 is a view along line 7—7 of Fig. 3.
Fig. 8 is a side view of a portion of the interflap sealing means.
Fig. 9 is a top view of the interflap sealing means shown in Fig. 8.
Fig. 10 is a side view of another portion of the interflap sealing means.
Fig. 11 is a top view of the sealing means shown in Fig. 10.
Fig. 13 is a cross-sectional view of the inner flap interflap sealing means with the sealing surfaces abutting to show the exhaust nozzle closed position.
Figure 12:
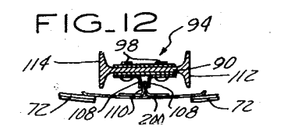
Fig. 12 is a view taken along line 12—12 of Fig. 4.

Referring to Figs. 3, 5 and 6, we see that rollers 102 and 104 of roller unit 94 are located at the after end of cam 90 and engage tracks 150 and 152 of adjacent outer flaps 40. Dimples or ribs 154 may be placed in tracks 150 and 152 to perform a strengthening function. As shown in Fig. 5, adjacent flaps 40 and 40' carry tracks 150 and 152, respectively, and these flaps engage rollers 102 and 104 of roller unit 94, respectively. It will be noted that tracks 150 and 152 are of considerably greater thickness at their after or downstream ends than they are at their forward ends and that the thickness of tracks 150 and 152 is uniformly progressive from their front or forward ends to their after or downstream ends. Due to the increased thickness of tracks 150 and 152 at their downstream ends, the rearward or downstream movement of wedge 90 and roller unit 94 will cause adjacent outer flaps 40 and 40' to separate and thereby cause outer flaps 40 to pivot or rotate outwardly to their outer position as shown in solid lines in Figs. 3 and 4. As flaps 40 separate and move toward their outer position, outer flap interflap sealing means 76 continue to center on projections 108 of roller unit 94 yet remain in frictional engagement with adjacent flaps 40 to form therewith a smooth surfaced exhaust nozzle of greater diameter. In practice, roller unit 94 will be assisted in moving exhaust nozzle 22 to its open position by the gas loading on the inner surface 56 of outer flaps 40 and the inner surface 54 of inner flaps 42. This gas loading imposes a force upon both flaps 40 and 42 so as to cause them to rotate or pivot outwardly to their outer or exhaust nozzle open positions.

Opposed yoke unit 116 co-acts with cam 90 to cause flaps 40 and 42 to rotate or pivot to or toward their inner of exhaust nozzle closed positions. Opposed yoke unit 116 consists of yoke 160 and opposed yoke 162. Yoke 160 is Y-shaped and consists of stem 164 and arms 166 and 168 and carries rollers 170 and 172 at the ends of arms 166 and 168. Rollers 170 and 172 are attached to yoke 160 by any convenient axle means such as nut and bolt units 174 and 176. Stem 164 of yoke 160 has a hole 178 located at its extremity and a bolt 179 passes therethrough to engage a lug 180 in the interior of outer flap 40 such that yoke 160 and opposed yoke unit 116 is attached to outer flap 40 at the extremity of the stem of its Y-shaped yoke while rollers 170 and 172 are pivotally attached to the extremities of arms 166 and 168 of yoke 160 and bear against the anti-flap side or surface 114 of cam or wedge 90.

Opposed yoke 162 is also Y-shaped in cross-section and, as is shown in Fig. 5, the arms 184 and 182 of opposed yoke 162 and the arms 166 and 168 of yoke 160 are directed toward each other while stem 186 of opposed yoke 162 and stem 164 of yoke 160 are positioned substantially perpendicular to the axis of cam 90. Opposed yoke 162 has hole 188 located in the extremity of stem 186 such that a bolt 189 may be passed through hole 188 so as to engage a lug comparable to lug 180 in the interior of adjacent outer flap 40' while roller units 190 and 192 are carried by arms 182 and 184 of opposed yoke 162 in the same fashion as described for yoke 160 such that rollers 190 and 192 bear against the anti-flap surface 112 of cam 90. By referring to Figs. 4 and 5, it will be noted that yokes 160 attaching to alternate outer flaps 40 while counter-yokes 162 attach to the remaining flaps and that both yokes 160 and counter yokes 162 of opposed yoke unit 116 are positioned and located at about the middle of the length of flaps 40.

Opposed yoke unit 116 works in conjunction with cam 90 to cause flaps 40 and 42 to pivot or rotate to or toward their inner or exhaust nozzle closed positions. As actuating cylinder-piston unit 134 causes actuating ring 130 to move forward or upstream, cam or wedge 90 also moves forward or upstream and as the respective rollers of yokes 160 and 162 bear against cam surfaces 112 and 114, the rollers are caused to separate due to the increased cam thickness therebetween as cam 90 moves forward. As rollers 190 and 192 of opposed yoke 162 are caused to separate from rollers 170 and 172 of yoke 160 due to the increased thickness of cam 90 therebetween, the stem extremities at holes 178 and 188 of yoke 160 and opposed yoke 162, respectively, are drawn toward each other. Since the yoke 160 and opposed yoke 162 stems are attached to adjacent outer flaps 40, the forward movement of cam or wedge 90 causes adjacent outer flaps to be drawn closer to each other thereby causing outer flaps 40 to pivot or rotate inwardly to or toward their inner or exhaust nozzle closed positions.

As pointed out previously, yoke 160 and opposed yoke 162 are located and attached to outer flaps 40 at substantially midlength of outer flap 40. Opposed yoke units 116 and the middle portions lengthwise of outer flaps 40 therefore form a hoop encompassing flaps 40, which hoop is positioned midway along the length of flaps 40. The hoop so formed performs the principal structural function inasmuch as it receives the gas loads acting on the inner surfaces of flaps 40 and 42 in hoop tension and in substantially balanced fashion due to its midlength position. Since the gas being discharged through exhaust nozzle 22 is of elevated temperature and high pressure, the strengthening function performed by the hoop so formed is of definite structural advantage to the exhaust nozzle since it directly absorbs most of the gas loads and thus serves to prevent the overloading of other exhaust nozzle components and engine parts which support the exhaust nozzle or which are attached to exhaust nozzle actuating parts.

The actuating means consisting of cam 90 and opposed yoke units 116 perform additionally to assist exhaust nozzle flaps 40 and 42 to maintain their positions against the force of the exhaust nozzle gas loads which operate on the inner surfaces of these flaps to cause them to rotate or pivot to or toward the exhaust nozzle open position. By assisting the exhaust nozzle flaps to maintain their position by absorbing the gas loads, the actuating means performs the additional function of preventing the gas loads imposed upon the flaps from being transferred to the other engine parts, some of which may be located in a critical temperature or pressure location.

Now referring to Figs. 4, 6, 8, 9, 10, 11, a more particular description of the interflap sealing means 76 which is used between outer flaps 40 will be given. Interflap sealing means 76 is composed basically of two pieces, namely outer strip 200 and inner strip 220. Outer strip 200 as shown in Fig. 6, is contained within outer flaps 40 and engages outer walls 72 and adjacent flaps 40 in friction engagement and in overlapping fashion and extends substantially the full length of outer flaps 40 such that it performs a sealing function between adjacent outer flaps 40 and permits relative circumferential movement between the outer flaps. Outer strip 200 is shown in more particular detail in Figs. 8 and 9 and by referring to these views, we see that outer strip 200 consists of sheet metal strip 202 which is a tapered strip with its greatest width at its downstream end.

The upstream end 204 may be slipped under spring fingers or the like, on adjacent outer flaps 40 so as to retain the forward end of outer strip 200 against the undersurface of outer walls 72 of adjacent flaps 40. The downstream end of outer strip 200 curves smoothly downwardly as shown in Fig. 8. It will be noted that hole 208 is located at the after end of outer strip 200 and that boss 210 is attached to the inner surface of outer strip 200 so that inner-diameter threads 212 align with hole 208. As will be described later, hole 208 and boss 210 are provided to connect outer strip 220. Track 214, which may or may not be interrupted, runs longitudinally along and is attached by welding or some other convenient method to the underside of outer strip 200. Lip 110 of track unit 214 is received between two pronged projections 108 of roller unit 94 so as to circumferentially position and center outer strip 200 and therefore interflap sealing means 76 between adjacent outer flaps 40.

Inner strip 220 of interflap sealing means 76 is located inboard or exterior of inner wall 70 of outer flap 40 and overlaps same in friction engagement so as to perform a sealing function and permit relative circumerential motion between the inner surfaces 70 of outer flays 40. Inner strips 220 is shown in greater detail in Figs. 10 and 11. Inner strip 220 consists basically of a sheet metal section 222 which has a smooth bend 224 at its after end. Hole 226 passes through the after end 224 of outer strip 220 and aligns with hole 208 and boss 210 of outer strip 200 so as to receive a bolt 211 to connect outer strip 200 with inner strip 220 at their after ends. The forward end of inner strip 220 is caused to bear against the undersurfaces of inner wall 70 of outer flaps 40 by tab units 228. Tab units 228, as best shown in Fig. 10, are of L-shaped cross section with the base of the L spaced from sheet metal strip 222 substantially the distance of the thickness of inner wall 70 such that inner wall 70 of outer flap 40 passes between and is engaged on opposite sides by surfaces 230 of strip 220 and surface 232 of tab unit 228. Stiffening web 229 is provided on the undersurfaces of inner strip 220 to perform a strengthening function.

Figure 24:
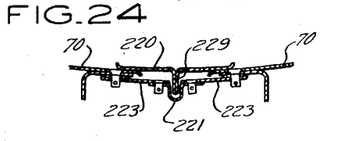
Fig. 24 is a view taken along line 24—24 of Fig. 4.

As best shown in Fig. 24, strip 220 is circumferentially positioned and contered with respect to adjacent outer flaps 40 by connection to outer strip 200 at its after end and by guide 221 at its forward end. Guide 221 is pivotally attached to guide arms 223, while guide arms 223 are pivotally attached to inner walls 70 of adjacent outer flap 40. Guide 221 has a recess therein which receives rib 229 of srip 220, thereby performing the positioning and centering function referred to supra.

When assembled as described above, inner strip 220 and outer strip 200 combine to form outer flap interflap sealing means 76 which are supported by outer flaps 40 and which move radially therewith but not circumferentially therewith since they are retained in circumferential position by roller unit 94 and guide unit 221. Sealing means 76 and flaps 40 combine to form an exhaust nozzle consisting of two spaced walls 70 and 72 which present smooth exterior surfaces and form an elongated annulus or an annular member of V-shaped cross section which has a smoothly faired after end 74 to present good base drag characteristics and further to fully enclose cams 90, track units 94, opposed yoke units 116, roller units 118 and substantially all portions of the flap actuating mechanism excepting actuating ring 130 and actuating piston cylinder unit 134.

It will be obvious that since outer strip 200 is contained within outer flaps 40 while inner strip 220 is external of adjacent outer flaps 40 and since the two are connected at their after ends, axial motion between sealing means 76 and flaps 40 is prevented. Further, tab units 228 combine with the action of attaching boss 210 to prevent radial motion between sealing means 76 and outer flaps 40. It should be borne in mind that interflap sealing means 76 engages adjacent outer flaps 40 in sealing engagement yet in sufficiently light friction engagement that circumferential relative movement is permitted between the sealing means and adjacent flaps as well as between adjacent flaps.

Figure 14:
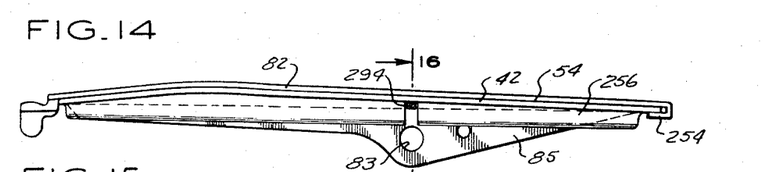
Fig. 14 is a cross-sectional view of an inner flap showing a pin retaining means.
Figure 15:
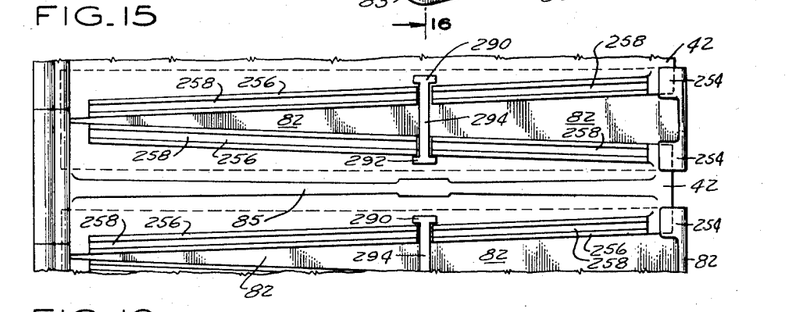
Fig. 15 is a bottom view of the structure shown in Fig. 14.
Figure 23:
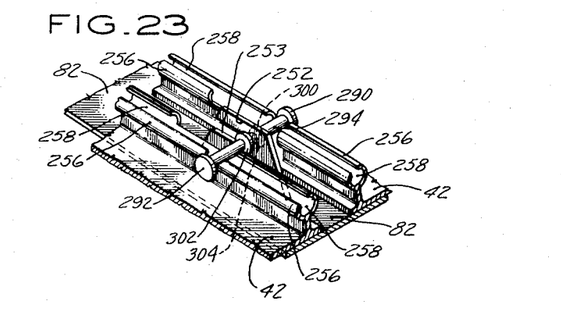
Fig. 23 is a perspective showing of sealing strip to vane attaching lug.

Now referring to Figs. 7, 13, 16 and 18, we note that inner flap interflap sealing means 250 is used to seal between adjacent inner flaps 42. Inner flaps 42 taper rearwardly, that is, the downstream end is narrower than the upstream end, as shown in Fig. 15 and extend longitudinally from exhaust outlet 60 about which they are circumferentially located in spaced relation and to which they are pivotally attached. Inner flaps 42 have smooth undersurfaces 54 which are shaped concave inwardly as shown in Figs. 14 and 17. Inner flap interflap sealing strips 82, which is part of sealing means 250, may be flat sheet metal plates which are forwardly tapering, that is, they have their greatest thickness at their after or downstream ends and form a longitudinally extending seal strip between and bearing juxtapositioned between and bearing against the undersurfaces 54 of adjacent inner flaps 42. Lug 252 extends upwardly from sealing strip 82 and has a longitudinally extending recess or slot 253 therein (see Fig. 23), which we will see later serves in part to secure sealing strip 82 to adjacent inner flaps 42 and also serves to center sealing strip 82 with respect to circumferentially movable adjacent inner flaps 42.

Figure 20:
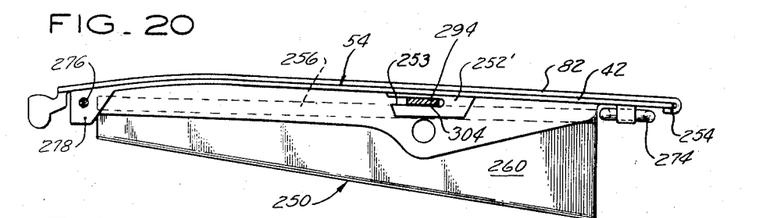
Fig. 20 is a cross-sectional view of an inner flap showing still another type of pin retaining means.
Figure 21:
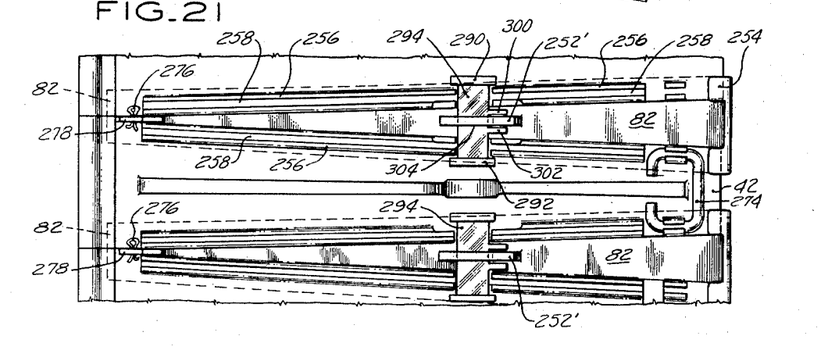
Fig. 21 is a bottom view of the structure shown in Fig. 20.

It will be noted by referring to Figs. 20 and 21 that sealing strip 82 has tabs 254 at its after or downstream end which engage the trailing edges of adjacent inner flaps 42 such that tabs 254 and lug 252′ combine to attach sealing strip 82 to adjacent inner flaps 42. Slot 253′ engages pin 294 to hold seal 82 against flaps 42.

Since inner flaps 42 are pivotally attached to and positioned circumferentially about exhaust outlet 60, and further, since sealing strips 82 smoothly connect adjacent inner flaps 42 such that relative circumferential movement is permitted between adjacent flaps 42 and since sealing strips 82 are carried by inner flaps 42, the plurality of inner flaps 42 and sealing strips 82, when assembled, as shown in Fig. 2, form a variable area exhaust nozzle through which the exhaust gases being discharged from engine 10 must pass.

As shown in Fig. 21, inner flap 42 has troth-shaped retaining means 256 extending substantially the full length of the longitudinal edges of flaps 42. Troth-shaped retaining means 256 carry longitudinal grooves 258 therein. The retaining track or projection formed by troth-shaped retaining means 256 is interrupted in its length as is longitudinal groove 258 therein, as is best shown in Fig. 21.

Figures 16, 17, 19:
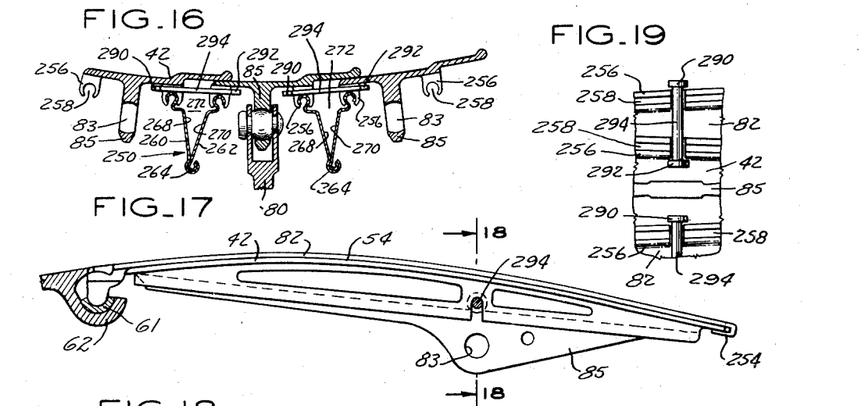
Fig. 16 is a view taken along line 16—16 of Fig. 14.
Fig. 17 is a cross-sectional view of an inner flap showing a second pin retaining means.
Fig. 19 is a partial bottom view of the configuration shown in Fig. 17.
Figure 18:
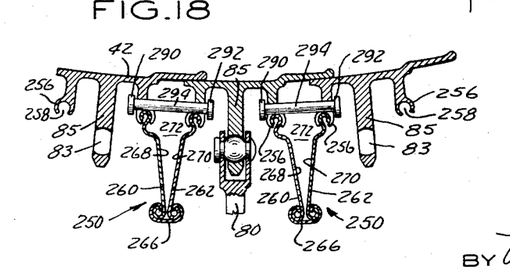
Fig. 18 is a view taken along line 18—18 of Fig. 17.

While sealing strips 82 form a portion of inner flap interflap sealing means 250, the second portion of this sealing means 250 is best shown in Figs. 7, 13 and 20. This portion of the inner flap interflap sealing means 250 comprises two tapered sheet metal pieces or flat plates 260 and 262 which are pivotally attached to each other at their top surfaces either by forming concentric sheet metal rolls as at 264 in Figs. 7 and 13 or by each engaging rolled sheet metal strip 266, as shown in Fig. 18. The bottom surfaces of tapered sheet metal pieces or flat plates 260 and 262 are curled and pivotally engage the longitudinal grooves 258 in the retaining tracks 256 of adjacent inner flaps 42 as shown in Figs. 7, 16 and 18. It will be noted that sheet metal pieces 260 and 262 are tapered uniformly throughout their length such that their greatest height exists at their downstream or after ends and that they are located external of and between adjacent inner flaps 42 and extend substantially the full flap length. Sheet metal pieces 260 and 262 have sealing or sheet metal surfaces 268 and 270 which abut one another juxtapositioned and in sealing relation to perform a sealing function between adjacent flaps 42 when the exhaust nozzle formed by flaps 42 is in its minimum area position. The exhaust nozzle is in its minimum area position when adjacent flaps 42 are at their closest circumferential position with respect to each other. As the exhaust nozzle formed by inner flaps 42 expands and flaps 42 separate, the sealing surfaces 268 and 270 of sheet metal strips 260 and 262 separate as they pivot about each other at their top surfaces or ends 264 and as they pivot about the retaining tracks 256 of adjacent flaps 42 such that sheet metal pieces 260 and 262 form a triangular sealing passage 272 with flaps 42. This triangular passage formed by sheet metal pieces 260 and 262 and flaps 42 is maximum in area when the exhaust nozzle is in its maximum area position. Sheet metal pieces 260 and 262 are retained in proper axial position with respect to flaps 42 by any convenient means such as wire hook 274 which passes through interrupted groove 258 or interrupted track 256 as shown in Fig. 21 and is bent so as to prevent rearward movement of sealing pieces 260 and 262. As further shown in Fig. 21, pin or cotter pin 276 may be passed through lug 278 which projects from sealing strip 282 such that pin 276 blocks the forward end of retaining tracks 256 of adjacent flaps 42 to prevent forward axial movement of sealing pieces 260 and 262.

It will be noted as shown in Figs. 7 and 13 that the sheet metal pieces 260 and 262 have opposed circumferentially directed strips or steps 280 and 282 positioned internal of sealing surfaces 268 and 270. These opposed, circumferentially directed steps permit sealing surfaces 268 and 270 of sheet metal pieces 260 and 262, respectively, to abut in sealing relation when inner flaps 42 are in their closest circumferential position when the exhaust nozzle formed by flaps 42 is in its minimum area position. Steps 280 and 282 perform the additional function of forming a very small and rearwardly directed gas leakage passage 284, as shown in Fig. 13, with flaps 42 through which any gas which may escape between sealing strip 82 and adjacent inner flaps 42 will be directed and discharged rearwardly in a thrust generating and thrust recovery function. That is, the thrust which is lost in the overall power plant output due to this gas leakage between adjacent inner flaps 42 is caused to pass through small passage 284 and be discharged rearwardly therethrough in a thrust generating function so as to regain the thrust lost due to gas leakage.

For optimum thrust output it is highly desirable that the exhaust nozzle presented by the plurality of flaps forming the exhaust nozzle be of circular cross section. When a series of overlapping flaps (see Figs. 16 and 18) or a series of flaps joined by interflap sealing means which overlap adjacent flaps (see Fig. 7) are used to form the exhaust nozzle, and the relative circumferential movement permitted between adjacent flaps is not limited, it is possible that certain flaps will separate circumferentially from their adjacent flaps to a greater extent than the remaining flaps such that either a non-circular exhaust outlet is presented or adjacent overlapping flaps separate such that the gas is discharged through a form other than a circle. To prevent this excessive circumferential relative motion between adjacent flaps and to thereby retain an exhaust nozzle of substantially circular cross section, motion limiting pins of the type shown in Figs. 14, 17, 20 and 21 are used.

For purposes of illustration, three different types of motion limiting and centering pins 294 are shown. These pins are located outboard of the exhaust nozzle flaps such as flaps 42 and run laterally between adjacent flaps 42 and are so positioned that projections 290 and 292, which are located at the ends of limiting pins 294, project beyond adjacent tracks or projections 256 on adjacent flaps 42 and pass through the interruptions of said tracks 256 such that pin projections 290 and 292 engage flap projections 256 to prevent adjacent flaps 42 from moving relative to each other beyond a pre-determined limit. The pin shown in Figs. 14, 15, and 16 is flat at cross-section as is best shown in Fig. 14, and has flat end projections 290 and 292 while the pin shown in Figs. 17, 18 and 19 is substantially circular in cross-section and has projections 290 and 292 of circular cross-section at its ends. As shown in Figs. 16 and 18, limiting pins 294 may be used to limit the relative circumferential movement between adjacent flaps 42 when such adjacent flaps form an exhaust nozzle by overlapping one another. Pin 294 is retained in position by sealing means 250.

Now referring to Figs. 20 and 21, we see that flaps 42 are of a variety which do not overlap one another but which are joined circumferentially by sealing strips 82. The centering pin 294, shown in Figs. 20 and 21, while not necessarily so limited, is flat in cross-section as are its end projections 290 and 292. In addition to these end projections, this pin 294 has substantially center positioned, spaced projections 300 and 302 which, when assembled, are located on the opposite sides of lug 252' which projects from sealing strip 82. The vertical groove 253' in lug 252' envelops section 304 of pin 292 which is located between central projections 300 and 302. Central projections 300 and 302, by engaging sealing strip lug 252', permit pin 292 to perform the additional function of centrally positioning overlapping sealing strip 82 between adjacent inner flaps 42. In short, the pin 294 shown in Figs. 20 and 21, not only limits circumferential relative motion between adjacent flaps 42 but also centrally positions sealing strip 82 with respect to adjacent flaps 42. Unit 250 retains pin 294.

Now referring to Fig. 3 we see the double flap exhaust nozzle 22 in its outer position in solid lines and in its inner position in phantom. When in its inner position, the minimum nozzle throat area is presented as is the minimum divergent length and angle (all as shown) between inner flaps 42 and outer flaps 40. When flaps 42 and 40 are in their outer position, the maximum nozzle throat area and the maximum divergent angle and length between these flaps is presented. As exhaust nozzle 22 moves from its inner position to its outer position, the throat nozzle area will increase as will the divergent angle and the divergent length of the exhaust nozzle.

It will be noted that in its inner position, flaps 42 form a convergent exhaust nozzle, while in their outer position, flaps 42 form a convergent-divergent exhaust nozzle, due to concave inner surface 54.

It is to be understood that the invention is not limited to the specific embodiment herein illustrated and described, but may be used in other ways without departure from its spirit as defined by the following claims.

I claim:

1. Interflap sealing means to seal between adjacent flaps of an exhaust nozzle comprising two sealing surfaces which are pivotable about each other external of the flaps and each of which pivotally engage adjacent flaps such that said sealing surfaces abut to perform an interflap sealing function when the exhaust nozzle is in its minimum area position.

2. Interflap sealing means to seal between adjacent flaps of an exhaust nozzle comprising two sealing surfaces which are pivotable about each other external of the flaps and each of which pivotally engage adjacent flaps such that said sealing surfaces abut to perform an interflap sealing function when the exhaust nozzle is in its minimum area position, and further to provide a small area, rearwardly directed gas leakage and passage which performs a thrust recovery function.

3. Interflap sealing means to seal between adjacent flaps of an exhaust nozzle comprising two sealing surfaces which are pivotable about each other external of the flaps and each of which pivotally engage adjacent flaps such that said sealing surfaces abut to perform an interflap sealing function when the exhaust nozzle is in its minimum area position and such that said sealing surfaces form a sealed passage with said flaps when the exhaust nozzle is in its maximum area position.

4. Interflap sealing means to seal between adjacent overlapping flaps of an exhaust nozzle comprising two tapered sealing surfaces which are located external of and between adjacent flaps and which extend substantially full flap length and which are pivotable about each other external of the flaps and each of which pivotally engage adjacent flaps at their bottom edges such that said sealing surfaces abut to perform an interflap sealing function when the exhaust nozzle is in its minimum area position.

5. Interflap sealing means to seal between adjacent overlapping flaps of an exhaust nozzle comprising two tapered sealing surfaces which are located external of and between adjacent flaps and which extend substantially full flap length and which are pivotable about each other external of the flaps and each of which pivotally engage adjacent flaps at their bottom edges such that said sealing surfaces abut to perform an interflap sealing function when the exhaust nozzle is in its minimum area position and further to provide a small area, rearwardly directed gas leakage and passage which performs a thrust recovery function.

6. Interflap sealing means to seal between adjacent overlapping flaps of an exhaust nozzle comprising two tapered sealing surfaces which are located external of and between adjacent flaps and which extend substantially full flap length and which are pivotable about each other external of the flaps and each of which pivotally engage adjacent flaps at their bottom edges such that said sealing surfaces abut to perform an interflap sealing function when the exhaust nozzle is in its minimum area position and further to provide a small area, rearwardly directed gas leakage and passage which performs a thrust recovery function and means to retain said sealing surfaces in position on the flaps.

7. Interflap sealing means to seal between adjacent flaps of an exhaust nozzle comprising two sealing surfaces each of which pivotally engages adjacent flaps, and means to pivotally attach the anti-flap edges of said surfaces together external of the flaps such that said sealing surfaces abut to perform an interflap sealing function when the exhaust nozzle is in its minimum area position.

8. Interflap sealing means to seal between adjacent flaps of an exhaust nozzle comprising a first sealing means located between adjacent flaps and juxtapositioned with respect to the undersurfaces of adjacent flaps and attached to adjacent flaps such that said flaps are moveable relative to said adjacent flaps, and a second sealing means comprising two sealing surfaces which are pivotable about each other external of the flaps and each of which pivotally engages adjacent flaps such that said sealing surfaces abut to perform an interflap sealing function when the exhaust nozzle is in its minimum area position.

9. In a variable area exhaust nozzle comprising an exhaust duct, a plurality of flaps pivotally attached to and positioned circumferentially about the periphery of said exhaust duct such that said flaps form a variable area exhaust nozzle, an interflap seal having two flat plates with the base of each plate pivotally engaging adjacent flaps while the top edges of said plates are pivotally connected such that said plates perform an exhaust gas sealing function when said variable area nozzle is in its minimum area position and such that said plates pivot about their pivoted top edges to form a passage when said exhaust nozzle is in its maximum area position.

10. In a variable area exhaust nozzle comprising an exhaust duct, a plurality of longitudinally extending flaps pivotally attached to and position circumferentially about the periphery of said exhaust duct such that said flaps form a variable area exhaust nozzle, an interflap seal located between and external of adjacent flaps comprising two flat plates which extend substantially the full flap length with the base of each plate pivotally engaging adjacent flaps while the top edges of said plates are pivotally connected such that said plates are juxtapositioned and perform an exhaust gas sealing function when said variable area nozzle is in its minimum area position and such that said plates pivot about their pivotable top edges to form a passage when said exhaust nozzle is in its maximum area position.

11. An aircraft jet engine variable area exhaust nozzle comprising an exhaust duct, a plurality of tapered flaps pivotally attached to and positioned circumferentially about the periphery of said exhaust duct, a tapered sealing strip located between adjacent flaps and extending the full flap length so as to seal said gap by being juxtapositioned to adjacent flap undersurfaces and such that said flaps and said strips form a variable area exhaust nozzle, a second interflap seal having two tapered flat plates which extend substantially the full flap length with the base of each plate pivotally engaging adjacent flaps while the top edges of said plates are pivotally connected such that said plates are juxtapositioned and perform an exhaust gas sealing function when said variable area nozzle is in its minimum area position and such that said plates pivot about their joined top edges to form a passage of substantially triangular cross section when said exhaust nozzle is in its maximum area position.

12. An aircraft jet engine variable area exhaust nozzle comprising an exhaust duct, a plurality of rearwardly tapered flaps with smooth undersurfaces pivotally attached to and circumferentially spaced about the periphery of said exhaust duct such that a gap exists between adjacent flaps, a forwardly tapered sealing strip located between adjacent flaps and extending the full flap length so as to seal said gap by being juxtapositioned to adjacent flap undersurfaces and such that said flaps and said strips form a variable area exhaust nozzle of circular cross section, means to attach said strip to adjacent flaps, a second interflap seal having two tapered flat plates which extend substantially the full flap length with the base of each plate pivotally engaging adjacent flaps while the top edges of said plates are pivotally connected such that said plates are juxtapositioned and perform an exhaust gas sealing function when said variable area nozzle is in its minimum area position and such that said plates pivot about their joined top edges to form a passage of substantially triangular cross section when said exhaust nozzle is in its maximum area position.

13. An aircraft jet engine variable area exhaust nozzle comprising an exhaust duct, a plurality of rearwardly tapered flaps with smooth undersurfaces pivotally attached to and circumferentially spaced about the periphery of said exhaust duct such that a gap exists between adjacent flaps, trough-shaped retaining means on the longitudinal edges of said flaps, a forwardly tapered sealing strip located between adjacent flaps and extending the full flap length and being juxtaposition to adjacent flap undersurfaces and such that said flaps and said strips form a variable area exhaust nozzle of circular cross section, lug means to attach said strip to adjacent flaps such that a sliding motion may take place therebetween, a second interflap seal having two forwardly tapering flat plates which extend substantially the full flap length with the base of each plate pivotally engaging said retaining means on adjacent flaps, attachment means pivotally engaging the top edges of said plates such that said plates are juxtapositioned and perform an exhaust gas sealing function when said variable area nozzle is in its minimum area position and such that said plates pivot about said attachment means and said flap retaining means to form a passage of substantially triangular cross section when said exhaust nozzle is in its maximum area position.

14. An aircraft jet engine variable area exhaust nozzle comprising an exhaust duct, a cooling air duct concentric with and surrounding said exhaust duct to form a cooling air passage therebetween, a plurality of rearwardly tapered flaps with smooth undersurfaces pivotally attached to and circumferentially spaced about the periphery of said exhaust duct such that a gap exists between adjacent flaps, a forwardly tapered sealing strip located between adjacent flaps and extending the full flap length and overlapping adjacent flaps while being juxtapositioned to said adjacent flap undersurfaces such that said flaps and said strips form a variable area exhaust nozzle of circular cross section, means to attach said strip to adjacent flaps, a second inter-flap seal having two tapered flat plates which extend substantially the full flap length with the base of each plate pivotally engaging adjacent flaps while the top edges of said plates are pivotally connected such that said plates are juxtapositioned and perform an exhaust gas sealing function when said variable area nozzle is in its minimum area position and such that said plates pivot about their joined top edges to form a passage of substantially triangular cross section when said exhaust nozzle is in its maximum area position, a second plurality of overlapping flaps surrounding said first plurality of flaps, linkage connecting said first plurality of flaps to said second plurality of flaps, means to pivot said second plurality of flaps about their forward edge to form an exhaust nozzle of variable area.

15. In an exhaust nozzle comprising an exhaust outlet, a series of longitudinally extending flaps with smooth undersurfaces pivotally attached to and located circumferentially and in spaced relation about said exhaust outlet, a raised retaining track on the longitudinal edges of each of said flaps, a longitudinally extending groove in each of said tracks, a longitudinally extending seal strip located between and bearing against the undersurfaces of adjacent flaps, and interflap sealing means comprising two sheet metal surfaces which are pivotally attached at their top surfaces while the bottom surface of each said piece pivotally engages adjacent longitudinal track grooves in adjacent flaps such that said sheet metal pieces abut in sealing relation when said exhaust nozzle is in its minimum area position.

16. In an exhaust nozzle comprising an exhaust outlet, a series of longitudinally extending flaps with smooth undersurfaces pivotally attached to and located circumferentially and in spaced relation about said exhaust outlet, a raised retaining track on the longitudinal edges of each of said flaps, a longitudinally extending groove in each of said tracks, a longitudinally extending seal strip located between and bearing against the undersurfaces of adjacent flaps, and interflap sealing means comprising two sheet metal surfaces which are pivotally attached at their top surfaces while the bottom surface of each said piece pivotally engages adjacent longitudinal track grooves in adjacent flaps such that said sheet metal pieces abut in sealing relation when said exhaust nozzle is in its minimum area position and such that said sheet metal pieces form a sealed passage with said flaps when said exhaust nozzle is in its maximum area position.

17. In an exhaust nozzle comprising an exhaust outlet, a series of longitudinally extending flaps with smooth undersurfaces pivotally attached to and located circumferentially and in spaced relation about said exhaust outlet, a raised retaining track on the longitudinal edges of each of said flaps, a longitudinally extending groove in each of said tracks, a longitudinally extending seal strip located between and bearing against the undersurfaces of adjacent flaps, and interflap sealing means comprising two sheet metal pieces each having a sealing surface between its top and bottom edge, said pieces having opposed circumferentially directed steps near the bottom edges thereof, means to pivotally attach said pieces at their top edges while the bottom edge of each of said pieces pivotally engages adjacent longitudinal track grooves in adjacent flaps such that the sealing surfaces of said sheet metal pieces abut in sealing relation when said exhaust nozzle is in its minimum area position.

18. In an exhaust nozzle comprising an exhaust outlet, a series of longitudinally extending flaps with smooth undersurfaces pivotally attached to and located circumferentially and in spaced relation about said exhaust outlet, a raised retaining track on the longitudinal edges of each of said flaps, a longitudinally extending groove in each of said tracks, a longitudinally extending seal strip located between and bearing against the undersurfaces of adjacent flaps, and interflap sealing means comprising two sheet metal pieces each having a sealing surface between its top and bottom edge, said pieces having opposed circumferentially directed steps near the bottom edges thereof, means to pivotally attach said pieces at their top edges while the bottom edge of each said piece pivotally engages adjacent longitudinal track grooves in adjacent flaps such that the sealing surfaces of said sheet meal pieces abut in sealing relation and such that said opposed circumferentially directed steps and said flaps form a small rearwardly directed passage through which leakage gas will be discharged downstream in a thrust recovery function.

References Cited in the file of this patent

UNITED STATES PATENTS 2,693,078     Laucher _________________ Nov. 2, 1954